US008941896B2

(12) United States Patent
Takabatake

(10) Patent No.: US 8,941,896 B2
(45) Date of Patent: Jan. 27, 2015

(54) IMAGE READING UNIT AND OVERHEAD IMAGE READING DEVICE

(75) Inventor: Masanari Takabatake, Ishikawa (JP)

(73) Assignee: PFU Limited, Ishikawa (JP)

( * ) Notice: Subject to any disclaimer, the term of this patent is extended or adjusted under 35 U.S.C. 154(b) by 516 days.

(21) Appl. No.: 13/075,720

(22) Filed: Mar. 30, 2011

(65) Prior Publication Data

US 2011/0286052 A1    Nov. 24, 2011

(30) Foreign Application Priority Data

May 18, 2010    (JP) .................................. 2010-114529

(51) Int. Cl.
  *H04N 1/04*    (2006.01)
  *H04N 1/00*    (2006.01)
  *H04N 1/028*    (2006.01)
  *H04N 1/193*    (2006.01)

(52) U.S. Cl.
  CPC ....... *H04N 1/00395* (2013.01); *H04N 1/00798* (2013.01); *H04N 1/00816* (2013.01); *H04N 1/00896* (2013.01); *H04N 1/02855* (2013.01); *H04N 1/193* (2013.01); *H04N 2201/0081* (2013.01); *H04N 2201/02456* (2013.01); *H04N 2201/02462* (2013.01); *H04N 2201/0436* (2013.01); *H04N 2201/0452* (2013.01)
  USPC ............ 358/497; 358/494; 358/474; 358/475

(58) Field of Classification Search
  USPC ......... 358/473, 497, 494, 474, 488, 483, 482, 358/505, 514; 250/239, 216, 234–236, 250/208.1; 382/312, 31
  See application file for complete search history.

(56) References Cited

U.S. PATENT DOCUMENTS

| 5,218,200 | A | * | 6/1993 | Morii et al. .................... 250/235 |
| 5,515,181 | A | * | 5/1996 | Iyoda et al. .................... 358/474 |
| 5,548,120 | A |   | 8/1996 | Parker et al. |
| 5,625,183 | A | * | 4/1997 | Kashitani et al. ............. 250/236 |
| 5,743,633 | A |   | 4/1998 | Chau et al. |
| 5,760,925 | A |   | 6/1998 | Saund et al. |
| 5,764,383 | A | * | 6/1998 | Saund et al. ................... 358/497 |
| 5,818,612 | A | * | 10/1998 | Segawa et al. ................ 358/494 |
| 5,835,241 | A |   | 11/1998 | Saund |

(Continued)

FOREIGN PATENT DOCUMENTS

| CN | 1510499 A | 7/2004 |
| JP | 63-037772 A | 2/1988 |

(Continued)

OTHER PUBLICATIONS

Japanese Notice of Rejection issued in Japanese Application No. 2010-114529, dated Jan. 28, 2014.

(Continued)

*Primary Examiner* — Cheukfan Lee
(74) *Attorney, Agent, or Firm* — McDermott Will & Emery LLP

(57) ABSTRACT

An image reading unit includes an image reading section that reads an image of a document in a one-dimensional direction by one-dimensionally aligned imaging elements, a light source that irradiates an image reading region by the image reading section with light, and a rotation head that holds the image reading section and the light source in a manner that the image reading section and the light source are rotatable relative to the document about a rotation axis which is parallel to an alignment direction of the imaging elements.

7 Claims, 6 Drawing Sheets

(56) References Cited

U.S. PATENT DOCUMENTS

| | | | |
|---|---|---|---|
| 5,861,622 A | 1/1999 | Tsai | |
| 5,969,829 A * | 10/1999 | Matsuda et al. | 358/475 |
| 5,978,102 A | 11/1999 | Matsuda | |
| 6,164,740 A | 12/2000 | Hirai et al. | |
| 6,185,010 B1 | 2/2001 | Watanabe | |
| 6,316,767 B1 * | 11/2001 | Paxton et al. | 250/234 |
| 6,325,288 B1 | 12/2001 | Spitz | |
| 6,609,162 B1 | 8/2003 | Shimizu et al. | |
| 6,738,166 B1 | 5/2004 | Kano et al. | |
| 6,771,394 B1 * | 8/2004 | Nakanishi et al. | 358/474 |
| 6,963,428 B1 | 11/2005 | Gann | |
| 6,965,460 B1 | 11/2005 | Gann et al. | |
| 7,460,284 B2 | 12/2008 | Hiromatsu | |
| 7,612,162 B2 | 11/2009 | Okada et al. | |
| 7,652,781 B2 | 1/2010 | Fukui et al. | |
| 7,724,390 B2 | 5/2010 | Imai | |
| 7,730,191 B2 | 6/2010 | Otsuka et al. | |
| 7,731,662 B2 | 6/2010 | Anderson et al. | |
| 7,916,331 B2 | 3/2011 | Shinozaki | |
| 7,982,919 B2 | 7/2011 | Mishima et al. | |
| 8,137,010 B2 | 3/2012 | Yoshida et al. | |
| 8,356,084 B2 | 1/2013 | Yamamoto | |
| 8,503,045 B2 | 8/2013 | Kubo et al. | |
| 2002/0093675 A1 | 7/2002 | Matsuda | |
| 2004/0109615 A1 | 6/2004 | Nakamura | |
| 2005/0175365 A1 | 8/2005 | Gomi | |
| 2007/0041039 A1 | 2/2007 | Doui | |
| 2010/0302607 A1 | 12/2010 | Hock | |
| 2011/0299135 A1 * | 12/2011 | Takabatake | 358/474 |
| 2011/0299136 A1 * | 12/2011 | Kubo et al. | 358/474 |
| 2012/0314264 A1 * | 12/2012 | Kimura | 358/474 |
| 2012/0320434 A1 * | 12/2012 | Takeda | 358/475 |
| 2012/0320437 A1 * | 12/2012 | Kanaya | 358/518 |

FOREIGN PATENT DOCUMENTS

| | | | |
|---|---|---|---|
| JP | 63107366 A * | 5/1988 | |
| JP | 09-050510 A | 2/1997 | |
| JP | 09-261419 A | 10/1997 | |
| JP | 2860119 | 12/1998 | |
| JP | 2982614 | 9/1999 | |
| JP | 3027915 | 2/2000 | |
| JP | 2000-307811 A | 11/2000 | |
| JP | 2002-111979 A | 4/2002 | |
| JP | 2004-187111 A | 7/2004 | |
| JP | 2004-187140 A | 7/2004 | |
| JP | 2006-058663 A | 3/2006 | |
| JP | 2006-166378 A | 6/2006 | |
| JP | 2006-279828 A | 10/2006 | |
| JP | 2007-037078 A | 2/2007 | |
| JP | 2007-067966 A | 3/2007 | |
| JP | 3931107 | 3/2007 | |
| JP | 2008-294676 A | 12/2008 | |
| JP | 2008-311729 A | 12/2008 | |

OTHER PUBLICATIONS

Japanese Office Action issued in Japanese Patent Application No. 2010-127238 dated Jan. 21, 2014.
U.S. Notice of Allowance issued in U.S Appl. No. 13/369,035 dated Feb. 19, 2014.
U.S. Office Action issed in U.S. Appl. No. 13/111,498 dated Apr. 10, 2014.
US Office Action issued in U.S. Appl. No. 13/111,498 dated Aug. 21, 2013.
US Office Action issued in U.S. Appl. No. 13/111,498 dated Jan. 25, 2013.
US Office Action issued in U.S. Appl. No. 13/369,035 dated Jul. 26, 2013.
United States Office Action issued in U.S. Appl. No. 13/445,436 dated Sep. 11, 2013.
United States Office Action issued in U.S. Appl. No. 13/444,567 dated Nov. 4, 2013.
United States Office Action issued in U.S. Appl. No. 13/464,742 dated Sep. 19, 2013.
United States Office Action issued in U.S. Appl. No. 13/434,114 dated Sep. 5, 2013.
Chinese Office Action issued in Chinese Application No. 201210194550.2 issued Jun. 3, 2014, with English Translation.
Japanese Office Action issued in Japanese Application No. 2011-131359 dated Aug. 12, 2014, with English Translation.

* cited by examiner

IMAGE READING UNIT AND OVERHEAD IMAGE READING DEVICE

BACKGROUND OF THE INVENTION

1. Field of the Invention

The present invention relates to an image reading unit and an overhead image reading device.

2. Description of the Related Art

There have been various types of image reading devices which read an image of a document and electrically performs a processing, and an overhead image reading device having improved facility of reading which is attained by reading an image by placing a document on a placement table or the like and imaging the document from above a reading surface of the document is included in the image reading devices.

For example, in the imaging device disclosed in Japanese Patent No. 2860119, a pedestal which has a bendable support column provided upright is placed on a placement surface on which an imaging object is placed, and the support column provided upright on the pedestal is provided with a camera for imaging the imaging object. With such configuration, it is possible to image the imaging object placed on the pedestal from above with the camera, and it is possible to change an imaging range by bending the support column during the imaging.

In the image scanner device disclosed in Japanese Patent No. 2982614, an image reading unit having an illumination device, an image sensor, a lens, and a reflection mirror is held in such a manner that the image reading unit is attached to a document placement table by using a stand arm for movably holding the image reading unit. With such configuration, it is possible to read an image of the document placed on the placement table from above the document by the image reading unit, and it is possible to enlarge a space on the document placement table by moving the image reading unit when the image reading unit is not used.

In the image scanner disclosed in Japanese Patent No. 3027915, a reading unit provided with a one-dimensional image sensor, a lens, a reflection mirror, and a two-dimensional image sensor is held by an arm attached to a placement table and further has a display device for displaying an image which is read at least by the two-dimensional image sensor. With such configuration, it is possible to read the image more appropriately by reading by the two-dimensional image sensor, reading the image of a document from above the document by the one-dimensional image sensor based on the image displayed by the display device.

Japanese Patent No. 3931107 discloses the non-contact image reading device having a support column for supporting a camera for reading an image and a placement table which is movable in a horizontal direction. With such configuration, it is possible to obtain an image of a large size document by imaging every predetermined ranges of the document from above with the camera by moving the placement table and combining the plurality of obtained images.

In the case of reading an image of a document by the image reading device described above, the image is read by receiving light reflected from the document. However, in the case where a light source for illuminating the document is not provided as in the image scanners or the like disclosed in Japanese Patent No. 3027915 and Japanese Patent No. 3931107, the imaging is performed by utilizing environmental light which is ambient light of the device. Image quality depends on environmental light in the case of imaging a document by the environmental light, but the environmental light is subject to large change depending on a place in which the image reading device is installed and a state of reading. Therefore, the image quality is unstable in some cases when the imaging is performed by utilizing the environmental light.

In contrast, in the case where the light source for illuminating the entire document is provided as in the imaging devices disclosed in Japanese Patent No. 2860119 and Japanese Patent No. 2982614, it is possible to ensure a predetermined luminance, but the irregularity in luminance depending on a portion of the document can occur when the entire document is irradiated with irradiation light from the light source. In this case, since irregularity occurs in the reflection light reflected from the document, an image read by receiving the reflection light sometimes has remaining unstable image quality though it is possible to ensure brightness of an entire portion of the read image. Further, in the case where the entire document is irradiated with the irradiation light from the light source as in the imaging devices disclosed in Japanese Patent No. 2860119 and Japanese Patent No. 2982614, it is necessary to irradiate the light in a wide range. Therefore, it is necessary to increase a quantity of the light from the light source, and there has been a tendency that power consumption by the light source is increased.

SUMMARY OF THE INVENTION

It is an object of the present invention to at least partially solve the problems in the conventional technology.

According to an aspect of the present invention, there is provided an image reading unit including: an image reading section that reads an image of a document in a one-dimensional direction by one-dimensionally aligned imaging elements; a light source that irradiates an image reading region by the image reading section with light; and a rotation head that holds the image reading section and the light source in a manner that the image reading section and the light source are rotatable relative to the document about a rotation axis which is parallel to an alignment direction of the imaging elements.

According to another aspect of the present invention, there is provided an overhead image reading device including: an image reading section that reads an image of a document in a one-dimensional direction by one-dimensionally aligned imaging elements; a light source that irradiates an image reading region by the image reading section with light; a rotation head that holds the image reading section and the light source in a manner that the image reading section and the light source are rotatable relative to the document about a rotation axis which is parallel to an alignment direction of the imaging elements; and an arm that is fixed to a placement surface on which the document is placed and supports the image reading unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, one embodiment of an image reading unit and an overhead image reading device according to the present invention will be described in detail based on the accompanying drawings. It should be noted that the present invention is not limited to the embodiments. Constituent elements of the following embodiment include those substituted by those skilled in the art or substantially equivalent thereto.

Embodiment

Figure 1:
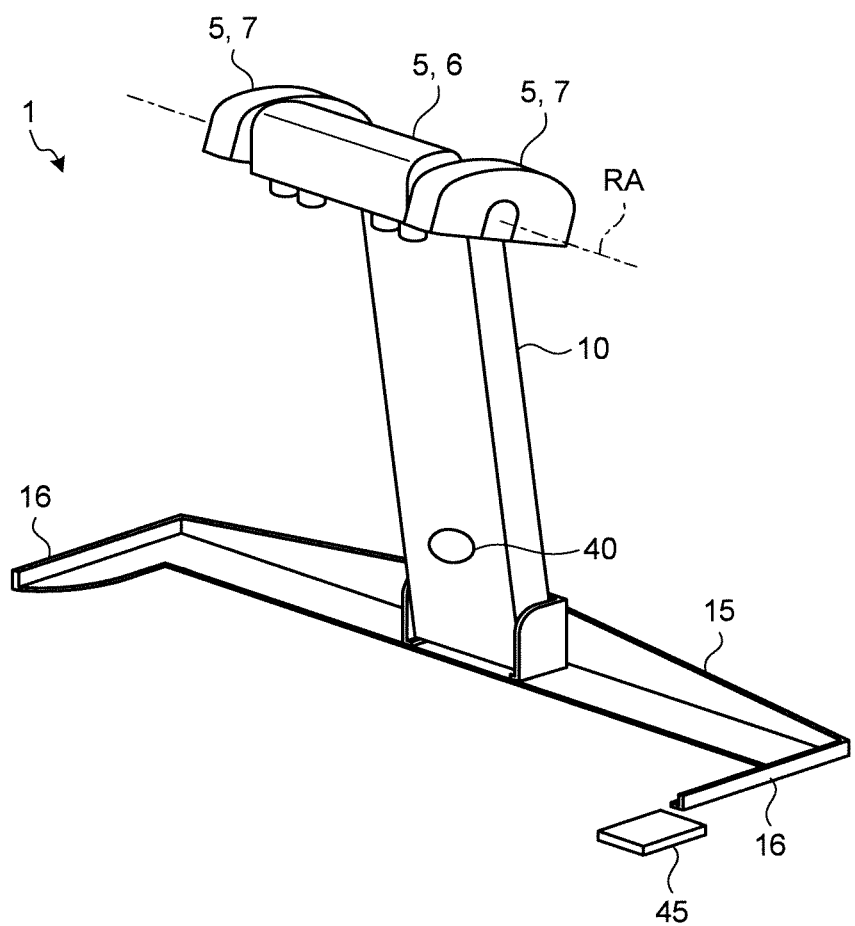
FIG. 1 is a perspective view showing an overhead image reading device according to one embodiment.

FIG. 1 is a perspective view showing an overhead image reading device according to one embodiment. An overhead image reading device 1 shown in FIG. 1 has a base 15, serving as a leg part used for placing the overhead image reading device 1 on an arbitrary part, an arm 10, which is connected to the base 15 at one end thereof, and a rotation head section 5, provided at a side opposite to a side at which the arm 10 is connected to the base 15 and has a rotation head 6 and head support sections 7, so that the head support sections 7 rotatably supports the rotation head 6.

The base 15 has a U-shape, and parts of the U-shape which are orthogonal to a straight line part at both ends of the straight line part at the center of the U-shape and connected to the straight line part are formed as guide sections 16. The guide sections 16 are provided for the purpose of stably placing the overhead image reading device 1 and the purpose as an indication of a placement position in the case of placing a document 75 (see FIG. 5) when reading an image of the document 75. More specifically, the base 15 is provided with the two guide sections 16, and an interval between the two guide sections 16 generally a reading width in the image reading of the document 75 by the overhead image reading device 1. The arm 10 connected to the base 15 is connected in the vicinity of the center between the guide sections 16 in the base 15 formed as described above and provided upright from the base 15, in an ordinary use state of the overhead image reading device 1.

The rotation head section 5 is provided as one example of the image reading unit according to the present invention, and the rotation head section 5 as one embodiment of the image reading unit is connected to a side opposite to an end part of the arm 10 at which the arm 10 is connected to the base 15 provided as described above. More specifically, the head support sections 7 of the rotation head section 5 are connected to an end part of the arm which is opposite to the end part at which the arm 10 is connected to the base 15. Consequently the rotation head section 5 is connected to and supported by the arm 10. Also, the rotation head 6 of the rotation head section 5 supported by the arm is supported by the head support sections 7 rotatably relative to the head support sections 7. More specifically, the two head support sections 7 are separated from each other in directions of the guide sections 16 of the base 15 and provided as projected in a direction which is the same as a direction in which the guide sections 16 are projected from the part at which the arm 10 is connected to the base 15.

A motor 50 (see FIG. 4) which enables rotation by an arbitrary rotation angle is provided inside the head support sections 7. The rotation head 6 is provided between the two head support sections 7 provided as described above and supported by the head support sections 7 in such a fashion that the rotation head 6 is rotatable by the motor 50 about a rotation axis RA extending in directions to the two head support sections 7.

The guide sections 16 of the base 15 are projected in a direction orthogonal to the rotation axis RA extending towards the directions of the two head support sections 7.

The arm 10 is provided with a human sensor 40 which responds when a human hand approaches thereto. As the human sensor 40, an infrared ray sensor which uses an infrared ray to detect that a human hand has approached thereto by detecting an infrared ray reflected by the human hand, an electrical capacitance type proximity sensor, or the like may be used. A scan switch 45 which is a start instruction means for instructing start of reading in the case of reading an image of the document 75 by the overhead image reading device 1 according to the present embodiment is provided in the vicinity of the base 15.

Figure 2:
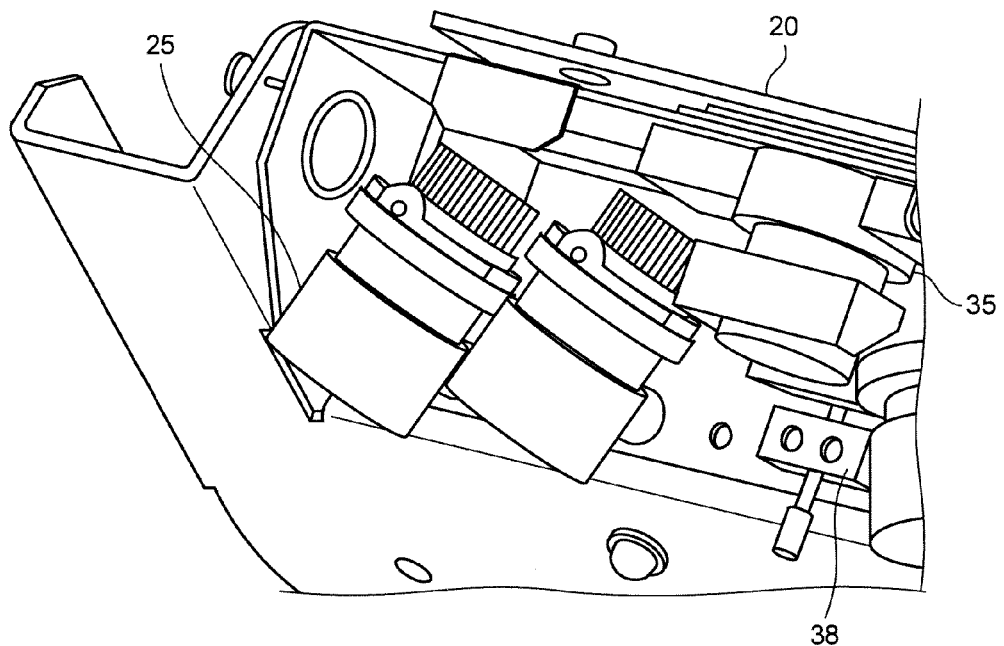
FIG. 2 is a sectional view showing a main part of a rotation head shown in FIG. 1.

FIG. 2 is a sectional view showing a main part of the rotation head section shown in FIG. 1. The rotation head 6 supported by the head support sections 7 has a line sensor 20 which is an image reading section capable of reading the image of the document 75 by a plurality of imaging elements (not shown), and a line light source sections 25 which is a light source emitting light to a region of an image read by the line sensor 20 (hereinafter referred to as image reading region by line sensor). The plurality of imaging elements which the line sensor 20 has are arranged in a one-dimensional alignment in a direction parallel to the rotation axis RA and provided as a light receiving section for converting received light into electric signals upon reception of the light. Since the plurality of imaging elements are arranged in one-dimensional alignment, it is possible for the line sensor 20 to read the image of the document 75 in a one-dimensional direction which is parallel to the rotation axis RA.

Since the rotation head 6 provided with the line sensor 20 and the line light source sections 25 is rotatably supported by the head support sections 7 connected to the arm 10, the rotation head section 5 having the rotation head 6 holds the line sensor 20 and the line light source sections 25 in such a fashion that the line sensor 20 and the line light source sections 25 are relatively rotatable with respect to the arm 10 about the rotation axis RA which is parallel to the alignment direction of the imaging elements.

The imaging elements provided in the line sensor 20 includes the imaging element capable of detecting red light, the imaging element capable of detecting green light, and the imaging element capable of detecting blue light, and reads a color image by combining optical signals detected by the respective imaging elements.

The rotation head 6 has a lens 35 which concentrates light from a direction of the document 75 to the line sensor 20, and a focusing mechanism 38 that adjusts a focal point for converging light on the line sensor 20 by the lens 35. The focusing mechanism 38 has an actuator such as a piezo motor and a voice coil motor, and the actuator enables movement of the lens 35 in a range direction from the line sensor 20. The focusing mechanism 38 adjusts a position of the focal point by adjusting the distance between the lens 35 and the line sensor 20 by moving the lens 35 by the actuator, thereby making it possible to converge light from a direction of the document 75 onto the line sensor 20 by the lens 35.

The plurality of line light source sections 25 are provided in the rotation head 6 and disposed at both sides of the lens 35 in the directions of the gap between the two head support sections 7.

Figure 3:
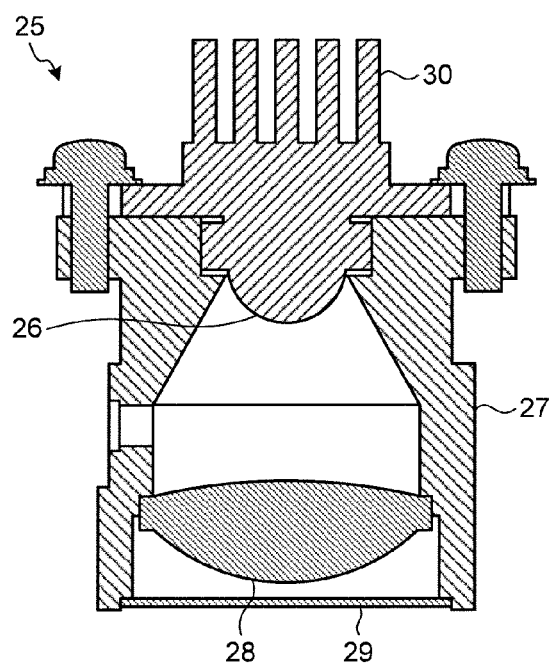
FIG. 3 is a sectional view showing one of line light source sections shown in FIG. 2.

FIG. 3 is a sectional view showing one of the line light source sections shown in FIG. 2. As a specific description of the line light source section 25 provided in the rotation head 6, the line light source section 25 has a white LED (Light Emitting Diode) 26, a collimator lens 28, a diffusion plate 29, a heat discharge plate 30, and a holder 27. The collimator lens 28 arranges light emitted from the white LED 26 into parallel rays. The diffusion plate 29 forms the parallel rays arranged by the collimator lens 28 into linear rays having linear cross section extending along a parallel direction to the rotation axis RA. The heat discharge plate 30 discharges heat generated by the white LED 26. The holder 27 holds the white LED 26, the collimator lens 28, the diffusion plate 29, the heat discharge plate 30 etc.

The collimator lens 28 is disposed at a travelling direction side of light emitted from the white LED 26, and the diffusion plate 29 is disposed at a travelling direction side of the parallel light beam when arranging the light from the white LED 26 into the parallel rays, or light beams, by the collimator lens 28. The heat discharge plate 30 is disposed at a side opposite to the light emission portion of the white LED 26, which is disposed at an outer part side of the line light source section 25.

The diffusion plate 29 forms the parallel rays that are obtained from light from the white LED 26 by the collimator lens 28 into the line that is in the direction parallel to the rotation axis RA. In other words, the diffusion plate 29 enables irradiation with the line of the parallel light beam from the collimator lens 28 in the direction parallel to the direction in which the image reading of the document 75 in the one-dimensional direction is performed by using the line sensor 20. A direction of emitting light from the line light source section 25 and a direction of reading the image of the document 75 are substantially the same in a circumferential direction about the rotation axis RA.

Figure 4:
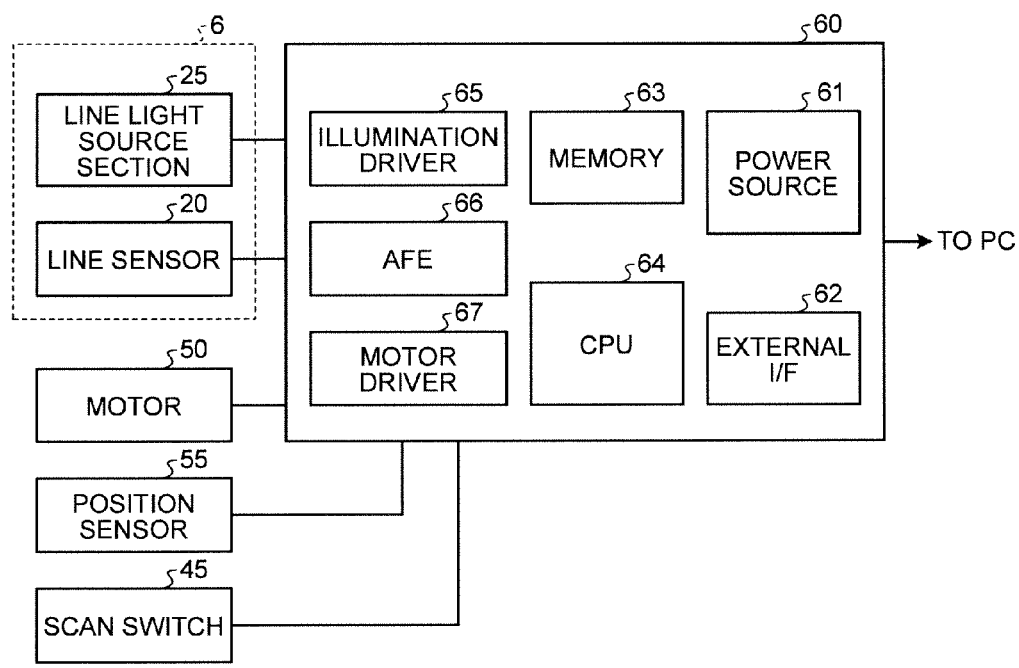
FIG. 4 is a diagram schematically showing a configuration of the overhead image reading device shown in FIG. 1.

FIG. 4 is a diagram schematically showing a configuration of the overhead image reading device shown in FIG. 1. The overhead image reading device 1 provided as described above has a control section 60 that controls the entire overhead image reading device 1, and the control section 60 is provided inside the arm 10. The line sensor 20 and the line light source sections 25 provided in the rotation head 6 are connected to the control section 60, and the motor 50 that enables rotation of the rotation head 6 is connected to the control section 60. Also, the scan switch 45 for instructing start of reading and a position sensor 55 to be used for positioning in the case of combining the RGB signals after the RGB signals are detected by the imaging elements for three colors (RGB) of the line sensor 20 are connected to the control section 60. Further, an external device such as a Personal Computer (PC) that performs input and output of signals with the overhead image reading device 1 is connected to the control section 60.

The control section 60 to which the above-described components are connected has a power source 61 that transforms externally inputted electricity into voltages usable in the electric components of the overhead image reading device 1 and supplies the voltages to the components, an external I/F (interface) 62 that is a connection portion with the external device when performing the signal input and output between the components of the overhead image reading device 1 and the external device, a memory 63 that is a main storage device, a Central Processing Unit (CPU) 64 that performs various arithmetic processings, an illumination driver 65 that controls light emission of the line light source sections 25, an analog front end circuit (AFE) 66 that performs gain adjustment and offset adjustment of an analog signal of light detected by the line sensor 20, and a motor driver 67 that adjusts rotation of the motor 50 that enables rotation of the rotation head 6.

Figure 5:
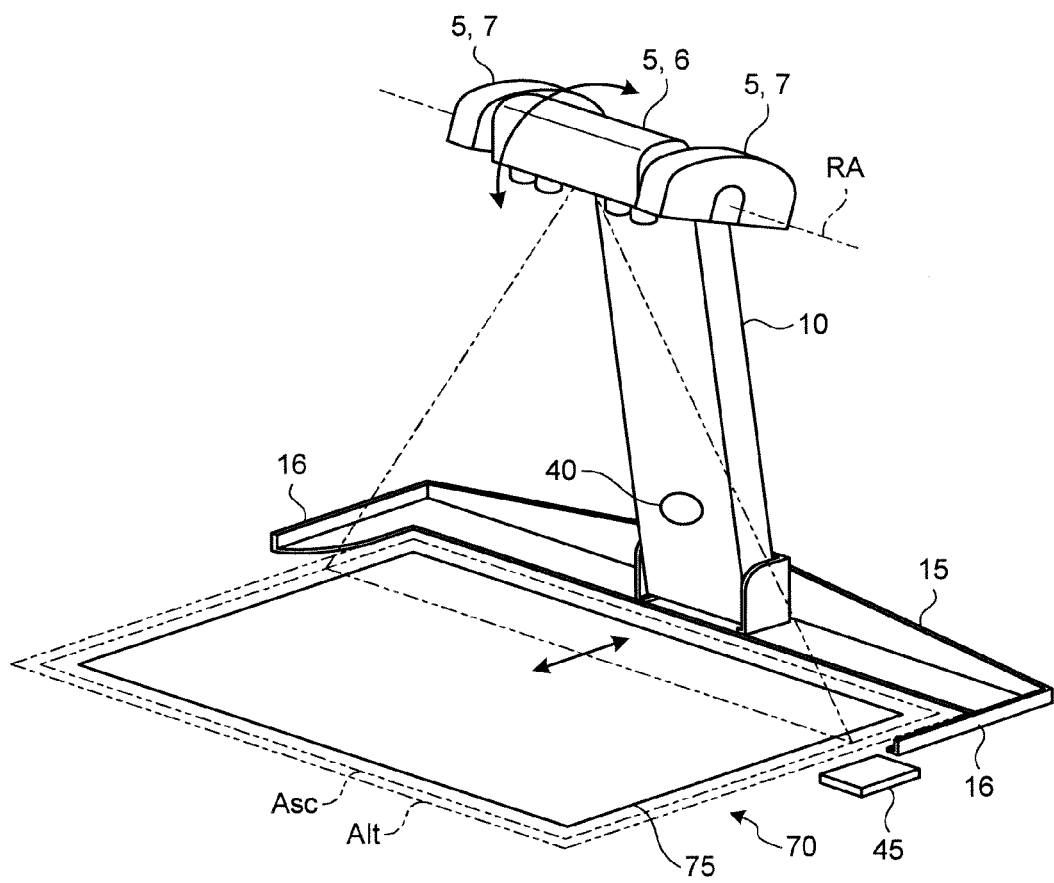
FIG. 5 is a schematic diagram illustrating a case of reading an image of a document.

The overhead image reading device 1 according to the present embodiment has the above-described configuration, and, hereinafter, operation thereof will be described. FIG. 5 is a diagram illustrating a case of reading an image of a document. The overhead image reading device 1 according to the present embodiment is used in a state of being placed on a desk or the like, and, in the case of reading the image of the document 75, the reading is performed in a state where the document 75 is placed on a placement surface 70 which is a part on which the overhead image reading device 1 placed.

In the case of placing the overhead image reading device 1 on the placement surface 70, a surface opposite to a surface to which the arm 10 is connected in the base 15 is faced to the placement surface 70 to be brought into contact with the placement surface 70. The base 15 is so provided as to be placed on the placement surface 70 as described above, and the arm 10 is connected to the base 15. Therefore, when the base 15 is placed on the placement surface 70, the arm 10 is fixed to the placement surface 70.

When the base 15 is placed on the placement surface 70, the arm 10 is fixed to the placement surface 70 as described above, so that the rotation head section 5 supported by the arm 10 is maintained with a constant distance from the placement surface 70 being kept. Therefore, the line sensor 20 and the line light source sections 25 held by the rotation head 6 of the rotation head section 5 are maintained in a state where constant distances from the placement surface 70 are kept.

As described above, in the case of placing the document 75 on the placement surface 70 when reading the image of the document 75 by the overhead image reading device 1 of which the base 15 is placed on the placement surface 70, the document 75 is placed at a side where the guide sections 16 in the base 15 are projected. In this case, when the document 75 has a rectangular shape, the document 75 may preferably be placed in a state where a pair of parallel sides among four sides approximates to a direction parallel to the direction along which the guide sections 16 are formed with at least a part thereof being positioned between the two guide sections 16.

In the case of reading the image of the document 75, the image is read in the state where the document is placed on the placement surface 70 as described above, and the human sensor 40 detects approach of a hand of a user when the document 75 is placed in the vicinity of the base 15. In the case where the detection is performed, the control section 60 determines that the reading of the document 75 is to be performed and performs preparations for start of the reading, such as start of electricity supply to the components.

In the case of actually starting the image reading of the document 75, an input operation for staring the reading of the document 75 is performed on the scan switch 45. In the case where the user performs the input operation on the scan switch 45, the input of the start of reading is transmitted to the control section 60. The control section 60 to which the signal for starting reading is transmitted from the scan switch 45 activates the components required for reading the image of the document 75. More specifically, while lighting the line light source sections 25 by controlling the line light source sections 25 by the illumination driver 65, light from the document 75 detected by the imaging elements of the line sensor 20 is adjusted by the AFE 66.

The motor 50 is activated by the motor driver 67, so that the rotation head 6 is rotated about the rotation axis RA. The rotation head 6 rotating about the rotation axis RA in other words holds the line sensor 20 and the line light source sections 25 relatively rotatable with respect to the document 75 about the rotation axis RA. The rotation axis RA in the case of rotating the rotation head 6 is in a direction parallel to an image reading direction by the line sensor 20 held by the rotation head 6 and a direction of the line of irradiation light of the line light source sections 25. Therefore, when the rotation head 6 is rotated, an image reading position by the line sensor 20 held by the rotation head 6 and an irradiation position by the line light source sections 25 move to a direction orthogonal to the rotation axis RA.

Figure 6:
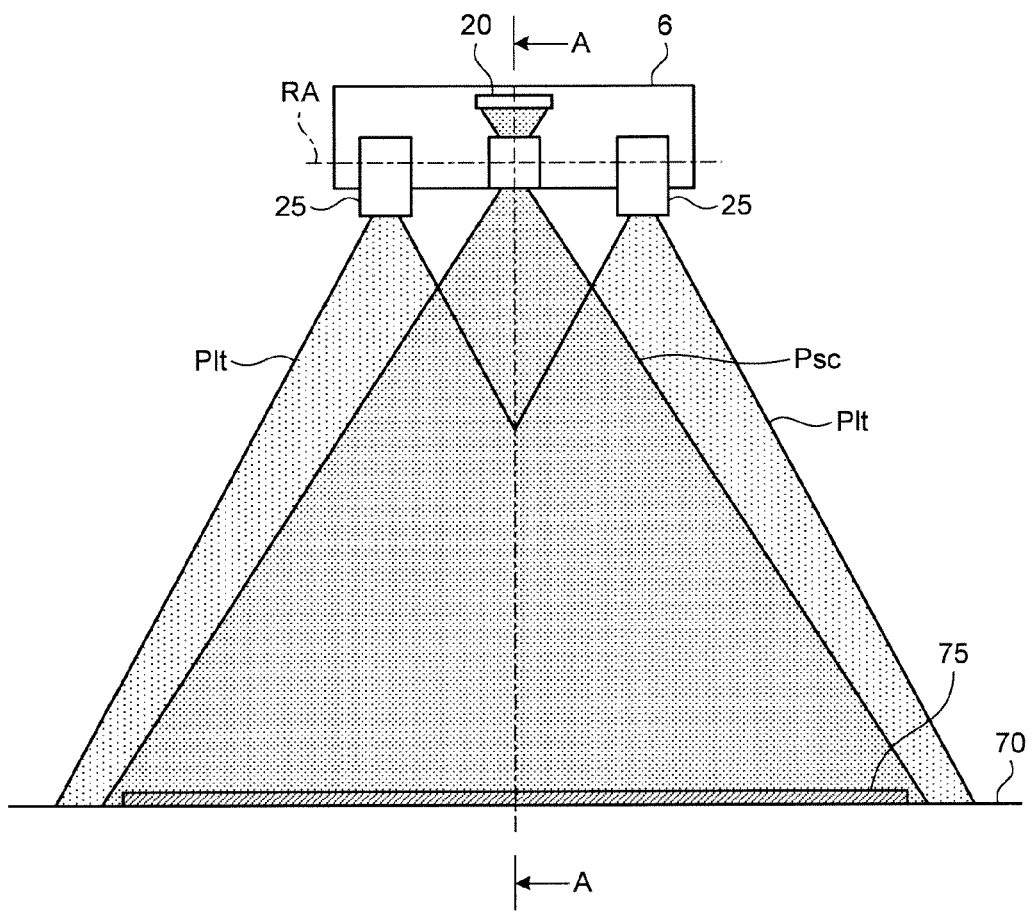
FIG. 6 is a schematic diagram showing a relationship between a scanning plane by a line sensor and an irradiation plane by the line light source sections.
Figure 7:
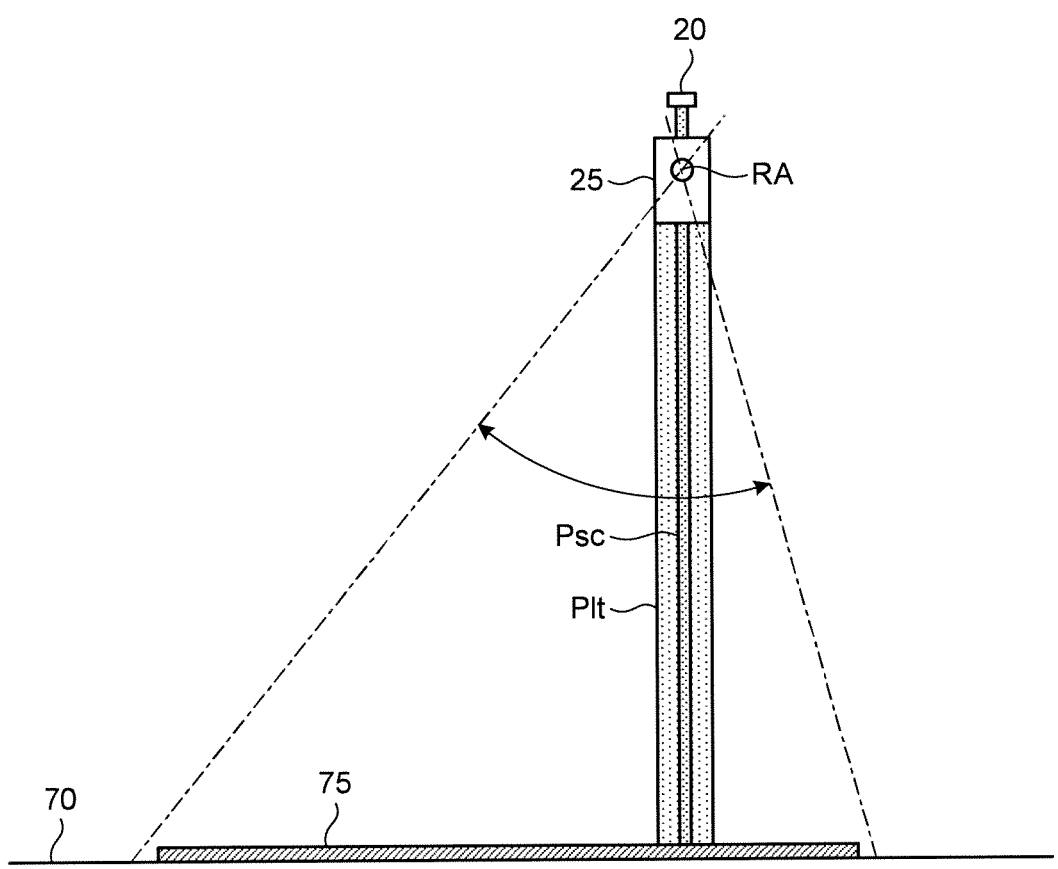
FIG. 7 is a sectional view taken along a line A-A of FIG. 6.

FIG. 6 is a schematic diagram showing a relationship between a scanning plane by the line sensor and an irradiation plane by the line light sources. FIG. 7 is a sectional view taken along a line A-A of FIG. 6. Hereinafter, a reading range in the case of reading an image by the line sensor 20 and a light irradiation range by the line light source sections 25 will be described. Since the line sensor 20 reads the image in the one-dimensional direction in the image reading, the image reading range by the line sensor 20 is a scanning plane Psc. The scanning plane Psc is a plane defined by a line along a linear direction of distance from the line sensor 20, i.e. a direction of distance from the lens 35, which is an incident portion of the light to be read by the line sensor 20, toward the placement surface 70 and a line along the one-dimensional reading direction by the line sensor 20. In short, the scanning plane Psc is a plane indicating the reading range in the image reading by the line sensor 20.

The irradiation range in the case of light irradiation by the line light source sections 25 is an irradiation plane Plt which is a plane defined by a line along a linear direction of distance from the line light source sections 25 and a line along a extending direction of the cross-section of the linear rays formed and emitted from the line light source sections 25. The plurality of line light source sections 25 are provided in the rotation head 6, and each of the line light source sections 25 emits light in the form of the irradiation plane Plt which is a plane indicating the irradiation range for the light irradiation.

The line sensor 20 that reads the image in the form of the scanning plane Psc reads the image of the document 75 in a direction parallel to the rotation axis RA, and the line light source sections 25 that irradiate light in the mode of the irradiation plane Plt emit the line of light in the direction parallel to the rotation axis RA. Therefore, both of the scanning plane Psc and the irradiation plane Plt are parallel to the rotation axis RA. In other words, the rotation axis RA is positioned in a plane which is identical to the scanning plane Psc and the irradiation plane Plt.

The light irradiation direction of the line light source sections 25 in the circumferential direction about the rotation axis RA is substantially the same as the reading direction of the image of the document 75 by the line sensor 20. Therefore, the scanning plane Psc and the irradiation plane Plt are overlapped. Further, since the line light source sections 25 are disposed at both sides of the lens 35 in the directions of the gap between the two head support sections 7, i.e. in the directions of the rotation axis RA, the irradiation plane Plt overlaps with the scanning plane Psc from both sides of the scanning plane Psc in the direction parallel to the rotation axis RA. More specifically, the line sensor 20 and the line light source sections 25 are disposed in such a fashion that the scanning plane Psc and the irradiation plane Plt are at the identical position, and, therefore, the image is read or the light is irradiated with the scanning plane Psc and the irradiation plane Plt being at the identical position in the case of reading the image of the document 75 while irradiating the document 75 by the line light source sections 25.

In the case of reading the image of the document 75 by using the line sensor 20, the image reading is performed along the scanning plane Psc as described above. However, in the case of performing the image reading of the document 75 along the scanning plane Psc, the image at a portion where the scanning plane Psc intersects the document 75 or the placement surface 70 is actually read. In this case, since the scanning plane Psc is the plane defined by the direction of the distance from the lens 35 and the one-dimensional reading direction of the line sensor 20, the portion read during a predetermined scanning by the line sensor 20 is in a direction along the one-dimensional reading direction by the line sensor 20 on the document 75 or the placement surface 70. In short, the portion of which the image is read is in the direction parallel to the rotation axis RA since the scanning plane Psc in the predetermined scanning by the line sensor 20 and the document 75 or the placement surface 70 intersect with each other.

Likewise, light is irradiated along the irradiation plane Plt in the case where the light is emitted from the line light source sections 25, and a portion where the irradiation plane Plt intersects on the document 75 or the placement surface 70 is irradiated with the light in the case of the light irradiation along the irradiation plane Plt. In this case, the irradiation plane Plt is the plane defined by a line along the direction of the distance from the line light source sections 25 and a line along the direction of the line of light formed in a line and emitted from the line light source sections 25. Therefore, in the case where a rotation angle of the rotation head 6 is a predetermined angle, a portion of the document 75 or the placement surface 70 irradiated with the light from the line light source sections 25 is in a direction along the line of the irradiation light formed in the line by the line light source sections 25, i.e. in the direction parallel to the rotation axis RA, on the document 75 or the placement surface 70.

As described above, the image is read in the direction parallel to the rotation axis RA in the case of reading the image of the document 75 by the line sensor 20, and the light irradiation is in the direction parallel to the rotation axis RA in the case of light irradiation from the line light source sections 25, but the scanning plane Psc and the irradiation plane Plt are at the identical position. Therefore, the image reading portion and the light irradiation portion are also overlapped, the line sensor 20 and the line light source sections 25 share the identical position in the image reading and the light irradiation. Therefore, in the case of reading the image of the document 75 by the line sensor 20, the image of the portion irradiated with the light from the line light source sections 25 is read. In short, the line sensor 20 reads the image of the document 75 in the one-dimensional direction which is parallel to the rotation axis RA as a result of receiving the light emitted in the form of the line which is parallel to the rotation axis RA from the line light source sections 25 and reflected from the document 75 or the like.

In the case of reading the image of the document 75, the light irradiation in the form of the irradiation plane Plt is performed by the line light source sections 25 while rotating the rotation head 6 about the rotation axis RA, and the image of the portion of the document 75 intersecting the scanning line Psc is read by the line sensor 20. Since both of the line sensor 20 and the line light source sections 25 are provided in the rotation head 6, the line sensor 20 and the line light source sections 25 rotate integrally with the rotation of the rotation head 6. Therefore, the scanning plane Psc and the irradiation plane Plt rotate about the rotation axis RA, and an angle in the circumferential direction about the rotation axis RA changes with the scanning plane Psc and the irradiation plane Plt being overlapped and at the identical position. Therefore, the portions of the document 75 or the placement surface 70 intersecting the scanning plane Psc and the irradiation plane Plt move in the direction orthogonal to the rotation axis RA with the portions being overlapped and at the identical position.

The line sensor 20 reads the image of the document 75 which is in the direction parallel to the rotation axis RA by receiving the light of the portion where the scanning plane Psc and the document 75 or the like intersects with each other. However, in the case where the line sensor 20 rotates together with the line light source sections 25 about the rotation axis RA to cause the portion at which the scanning plane Psc and the document 75 or the like intersects with each other to move in the direction orthogonal to the rotation axis RA, the line sensor 20 also reads the image in the direction orthogonal to the rotation axis RA.

More specifically, the line sensor 20 is capable of reading the image in the direction orthogonal to the rotation axis RA which is the movement direction of the reading portion while reading the image in the direction parallel to the rotation axis RA by reading the image of the intersection portion of the document 75 by causing the intersection portion between the scanning plane Psc and the document 75 or the like to move in the direction orthogonal to the rotation axis RA. Therefore, the line sensor 20 is capable of reading the image of the document 75 in the two-dimensional direction which is the image of the document 75 in the both ranges of the direction parallel to the rotation axis RA and the direction orthogonal to the rotation axis RA, and the line sensor 20 reads the image within the range of the intersection portion between the scanning plane Psc and the document 75 or the like which moves on the document 75.

In the case where the line sensor 20 is rotated about the rotation axis RA as described above, the distance between the line sensor 20 and the document 75 is changed depending on the rotation angle. In other words, the distance between the line sensor 20 and the document 75 is varied for each of the moving the intersection portions between the scanning plane Psc and the document 75 or the like. Therefore, in the case of reading the image of the document 75 while rotating the line sensor 20 by rotating the rotation head 6, the reading is performed while adjusting the position of the focal point of the line sensor 20, i.e. adjusting the focusing, by moving the lens 35 by activating the focusing mechanism 38 in response to the rotation angle.

As described above, the line sensor 20 reads the image of the document 75 by performing operation of rotating the line sensor 20 about the rotation axis RA by the rotation head section 5. Therefore, a range of the intersection portion between the scanning plane Psc and the document 75 or the like, which is moved by the rotation of the line sensor 20, is a scanning range Asc that is an image reading range by the line sensor 20 or the overhead image reading device 1 according to the present embodiment. Likewise, the line light source sections 25 irradiate the document 75 by moving the irradiation portion in the form of the line by performing operation of rotating the line light source sections 25 about the rotation axis RA by the rotation head section 5. Therefore, a range of the intersection portion between the irradiation plane Plt and the document 75 or the like, which is moved by the rotation of the line light source sections 25, is an irradiation range Alt for the document 75 or the placement surface 70 irradiated by the line light source sections 25 or the overhead image reading device 1 according to the present embodiment. The scanning range Asc and the irradiation range Alt are overlapped at a substantially same position and have a same range as in the relationship between the scanning plane Psc and the irradiation plane Plt.

In the case of reading the image of the document 75, the line sensor 20 reads the image of the document 75 within the scanning range Asc by rotating the rotation head 6, but the rotation head 6 is at rest before the start of reading the image of the document 75 in a state where the intersection portion between the scanning plane Psc and the document 75 or the like and the intersection portion between the irradiation plane Plt and the document 75 or the like are positioned in the vicinity of the base 15. In the case where the image reading of the document 75 is started from the above-described state, the rotation head 6 rotates about the rotation axis RA in a direction for the intersection portions departing from the base 15, and, when the rotation of the rotation head 6 reaches to a predetermined angle, the motor 50 starts reverse rotation, so that the rotation head 6 starts to rotate in a direction reverse to the previous direction. In short, in this case, the rotation head 6 starts to rotate in a direction in which the intersection portion between the scanning plane Psc and the document 75 or the like, and that between the irradiation plane Plt and the document 75 or the like approach to the base 15.

For the line sensor 20 and the line light source 25, in the case that the scanning plane Psc and the irradiation plane Plt have rotated to a predetermined angle in the direction off the base 15 by rotating the rotation head 6, the line sensor 20 stops the image reading of the document 75, and the line light source 25 stops irradiation. Therefore, when the rotation head 6 rotates in the direction for the scanning plane Psc and the irradiation plane Plt approaching to the base 15, the rotation head 6 rotates without reading the image of the document 75.

As described above, when the rotation angle of the rotation head 6 is the angle before the image reading of the document 75 and the distance between the intersection portion between the scanning plane Psc and the document 75 or the like, and that between the irradiation plane Plt and the document 75 or the like and the base 15 is the distance before the image reading of the document 75 by the rotation of the rotation head 6, the motor 50 is stopped, and the rotation of the rotation head 6 is stopped. In short, the rotation head 6 returns to the state before the image reading of the document 75. Thus, the overhead image reading device 1 stops the operation after reading the image of the document 75.

The overhead image reading device 1 read the image of the document 75 as described above, and image information of the document 75 read by the line sensor 20 is transmitted to the PC to undergo an appropriate or arbitrary processing such as shading and clopping by the PC.

The rotation head section 5 of the foregoing description has the line light source sections 25 for irradiating the image reading region by the line sensor 20 with light, and the line sensor 20 and the line light source sections 25 are held by the rotation head section 5 in a relatively rotatable fashion with respect to the document 75. With such configuration, in the case of reading an image of the document 75 by the line sensor 20, it is possible to perform the reading by emitting light from the line light source sections 25 and receiving the light reflected from the document 75 by the imaging elements of the line sensor 20. Also, since the line sensor 20 and the line light source sections 25 are held by the rotation head 6 of the rotation head section 5 in a relatively rotatable fashion with respect to the document 75, it is possible to read the image by the line sensor 20 while maintaining a distance from the document 75 to the predetermined distance and irradiating the image reading region with the use of the line light source sections 25 during rotation of the line sensor 20 and the line light source sections 25. Further, since the line light source sections 25 irradiate the image reading region by the line sensor 20 with light, without irradiating an entire portion of the document 75 with the light, the irradiation range is narrowed. Therefore, it is possible to suppress luminance irregularity at the portion irradiated with the irradiation light from the line light source sections 25, thereby making it possible to suppress irregularity of the light reflected from the portion of the document 75 irradiated with the irradiation light. Thus, it is possible to read the image by the line sensor 20 while keeping a distance between the document 75 and the line sensor 20 to a desired distance, and keeping luminance of the reading portion to constant luminance. Also, since the line light source sections 25 irradiate the image reading region by the line sensor 20 with light, irradiation with a requisite minimum light quantity is enabled, thereby making it possible to read the image with the requisite minimum power consumption. As a result, it is possible to read the image while maintaining consistent image quality and suppressing an increase in power consumption.

Also the line sensor 20 and the line light source sections 25 are disposed in such a fashion that the scanning plane Psc and the irradiation plane Plt are at the identical position. Therefore, in the case of reading an image of the document 75 by the line sensor 20, it is possible to read the image reading region while more reliably irradiating the image reading region with the use of the line light source sections 25 as well as to more reliably reduce the irradiation range of the line light source sections 25. Thus, it is possible to perform the reading while more reliably keeping luminance of the reading portion in the image reading by the line sensor 20 to constant luminance, and it is possible to suppress power consumption. As a result, it is possible to more reliably read the image while maintaining consistent image quality and more reliably suppressing an increase in power consumption.

Also, the rotation axis RA in the case where the rotation head 6 rotates, i.e. the rotation axis RA in the case where the line sensor 20 and the line light source sections 25 rotate relative to the document 75, is in the plane identical to the scanning plane Psc. Therefore, it is possible to read the image of the document 75 in the two-dimensional direction by rotating the rotation head 6 having the line sensor 20 about the rotation axis RA.

More specifically, the line sensor 20 is provided so as to read the image of the document 75 in the one-dimensional direction, but it is possible to read the image also in the direction orthogonal to the one-dimensional direction of the image reading by the line sensor 20 by reading the image while rotating the line sensor 20 about the rotation axis RA that is positioned in the plane identical to the scanning plane Psc. Therefore, in the case of reading the image of the document 75 in the two-dimensional direction, it is possible to more reliably read the image in the two-dimensional direction by the line sensor 20 that has the one-dimensionally aligned imaging elements and reads the image in the one-dimensional direction without using an area sensor that reads an image in the two-dimensional direction by a multiple of imaging elements aligned in the two-dimensional direction. As a result, it is possible to more reliably read the image of the document 75 while suppressing the production cost.

Also, in the image reading of the document 75, the line sensor 20 reads the image of the document 75 by rotating about the rotation axis RA by the rotation operation of the rotation head 6. Thus, it is possible to more reliably read the image of the document 75 in the two-dimensional direction by using the line sensor 20 for reading the image of the document 75 in the one-dimensional direction. As a result, it is possible to more reliably read the image of the document 75 while suppressing the production cost.

Further it is possible to easily rotate the line sensor 20 and the line light source sections 25 in the unitary fashion by holding both of the line sensor 20 and the line light source sections 25 by the rotation head 6 and rotating the rotation head 6 by the motor 50 provided in the head support sections 7. Thus, it is possible to easily move the line sensor 20 and the line light source sections 25 on the document 75 while maintaining the state in which the scanning plane Psc and the irradiation plane Plt are at the identical position, thereby making it possible to perform the reading while more easily and reliably maintaining luminance of the reading portion in the image reading by the line sensor 20 to constant luminance. As a result, it is possible to easily and reliably read the image with consistent image quality.

The overhead image reading device 1 according to the present embodiment is provided with the arm 10 to be fixed to the placement surface 70 on which the document 75 is placed, and the rotation head section 5 provided with the line sensor 20 is supported by the arm 10. With such configuration, it is possible to keep a constant distance as a distance between the line sensor 20 and the document 75 to, and it is possible to easily perform focusing when reading the image of the document 75 by the line sensor 20. Also, since the rotation head section 5 is supported by the arm 10, it is possible to read the image of the document 75 while more reliably maintaining both of the distance between the line sensor 20 and the line light source sections 25 and the distance between the line sensor 20 and the document 75 to the predetermined distances. Therefore, in the case of reading the image by the line sensor 20, it is possible to perform the reading while more reliably maintaining the distance between the document 75 and the line sensor 20 to a desired distance and keeping luminance of the reading portion to constant luminance. Further, since the rotation head section 5 is supported by the arm 10, it is possible to maintain predetermined states of the position relationship between the document 75 and the line sensor 20 and the position relationship between the document 75 and the line light source sections 25, thereby making it possible to more reliably irradiate the image reading region by the line sensor 20 with the light in the requisite minimum quantity with the use of the line light source sections 25. As a result, it is possible to read the image while maintaining consistent image quality and suppressing an increase in power consumption.

Also, since the arm 10 is connected to the base 15 which can be placed on the placement surface 70, it is possible to fix the arm 10 only by placing the base 15 on the placement surface 70, thereby making it possible to easily fix the arm 10 to the placement surface 70. Therefore, it is possible to easily keep the distance between the line sensor 20 and the document 75 to a constant distance, thereby making it possible to more easily perform focusing in the case of reading the image of the document 75 by the line sensor 20. As a result, it is possible to more easily read the image while maintaining consistent image quality.

Also, since the document 75 is placed on the placement surface 70 such as a desk when reading the image, it is unnecessary to provide the overhead image reading device 1 with a holding section dedicated to the document 75. Therefore, it is possible to downsize the overhead image reading device 1. As a result, in the case of not using the overhead image reading device 1, it is possible to effectively use a part on which the overhead image reading device 1 is not disposed, and it is possible to use a top surface of a desk or the like as the placement surface 70 in the case of the reading of the document 75 by the overhead image reading device 1, thereby improving convenience.

Also, since the base 15 is provided with the guide sections 16, it is possible to improve stability when placing the overhead image reading device 1 on the placement surface 70. Further, since the guide sections 16 indicate the reading width when reading the image of the document 75, it is possible to easily place the document at the part where the image can be read as well as to realize easy recognition of the range of the document 75 of which the image can be read in the case of reading the image by placing the document 75 on the placement surface 70. As a result, it is possible to improve convenience when reading the image of the document 75.

In the overhead image reading device 1 according to the embodiments, since the line sensor 20 performs the reading while rotating about the rotation axis RA in the state where the document 75 is placed on the placement surface 70, it is sometimes difficult to recognize the range of the document 75 of which the image can be read. Therefore, the overhead image reading device 1 further may have an imaging range display section that displays an imaging range in the case of reading the image of the document 75 by the line sensor 20.

As the imaging range display section 80, a light source different from the line light source sections 25 may be used, and the above-described scanning range Asc may be directly displayed on the placement surface 70 as the imaging range by irradiating the placement surface 70 with light in the form of the imaging range from the light source, or the placement surface 70 may be irradiated with a laser beam in the form of an outer frame of the scanning range Asc by using a laser projection formed of a laser and a diffraction grating. As another example of the imaging range display section, the imaging range display section may be realized by providing an area sensor capable of imaging the imaging range in addition to the line sensor 20 and providing the control section 60 with a computer program or an electric circuit capable of transmitting image information obtained by the area sensor to the PC and displaying on a display section of the PC the image obtained by the area sensor with the image being overlapped with the scanning range Asc.

By providing the imaging range display section as described above, in the case of placing the document 75 on the placement surface 70 when reading the image of the document 75 by the line sensor 20, it is possible to read the image by more reliably positioning the intended image reading portion inside the scanning range Asc. Therefore, it is possible to more reliably read the image of the desired range in the document 75. As a result, it is possible to more reliably obtain the desired image.

Also, in the case of providing the imaging range display section as described above, the imaging range display section may preferably display the scanning range Asc based on the detection result of the human sensor 40. In short, the imaging range display section may preferably display the scanning range Asc in the case where approach of a hand or the like of the user is detected. It is possible to display the scanning range Asc at the time point when the user approaches to the overhead image reading device 1 without performing an operation of displaying the scanning range Asc by causing the imaging range display section to display the scanning range Asc when the approach of the hand or the like of the user is detected by the human sensor 40. With such configuration, since the intended image reading portion is easily positioned inside the scanning range Asc when reading the image of the document 75, it is possible to more easily read the image of the desired range in the document 75. As a result, it is possible to more easily obtain the desired image.

Also, in the case of displaying the scanning range Asc based on the detection result by the human sensor 40 as described above, it is preferable to control the overhead image reading device 1 in such a manner that minimum power consumption is maintained by energizing only the part controlling the human sensor 40, i.e. in such a manner that a so-called standby mode is kept, in an ordinary state where the image reading is not performed. In this case, when the human sensor 40 detects the approach of the hand or the document 75 in the standby mode, the overhead image reading device 1 recovers from the standby mode and displays the scanning range Asc by the imaging range display section. When a certain time has passed after termination of image reading of the document 75, the overhead image reading device 1 shifts to the standby mode. With such configuration, since it is unnecessary to perform switching operation between ON/OFF of the power switch, it is possible to easily perform the operation in the image reading, thereby making it possible to easily attain a reduction in power consumption without impairing operability.

Also the base 15 may be provided with a sheet (not shown) that can be spread on the placement surface 70 for reading an image of the document 75 and can be folded and housed in the base 15 when the image reading is not performed. It is possible to facilitate cropping in the case of performing the cropping after the image reading by providing the sheet which may preferably be black, for example, that is distinguishably different from the color of the document 75. As a result, it is possible to facilitate processing the reading image of the document 75, regardless of the color of the placement surface 70.

Further, in the line light source section 25 of the overhead image reading device 1 according to the embodiments, the light from the white LED 26 of the line light source sections 25 are formed into the parallel light beam by the collimator lens 28, and the parallel light beam is formed into a line by the diffusion plate 29. However, the light for emitting light in the form of line may be provided by a configuration other than that described above, and the light may be formed into a line by a method other than that described above. The light source may be a light source that emits light in the form of a line by using a diffraction grating or a cylindrical lens. The mode of the light source is not limited insofar as the light source is capable of locating the irradiation plane Plt at the same position as the scanning plane Psc of the line sensor 20.

Further, the overhead image reading device 1 according to the embodiments is provided with the scan switch 45, and the image reading of the document 75 is started by performing the input operation on the scan switch 45. However, the instruction of the start of image reading may be given by way of other than the scan switch 45 that is manually operated. For example, a foot switch to be used for performing the input operation for the instruction of start of image reading may be provided so as to start the image reading by the input operation on the foot switch, or the image reading may be started by an input operation on the PC connected to the control section 60. Alternatively, the image reading may be started in the case where predetermined conditions are satisfied in such a manner that the image reading is started upon determination of completion of setting of the document 75, in which the determination is made when there is no reaction during a certain period of time after detection of the hand or the like of the user by the human sensor 40.

Further, in the overhead image reading device 1 according to the embodiments, the arm 10 is fixed to the placement surface 70 by placing the base 15 on the placement surface 70. However, the arm 10 may be fixed to the placement surface 70 by a means other than the placement of the base 15 on the placement surface 70. For example, a holding means for holding from ends of a desk or the like may be provided so that the arm 10 may be fixed to the placement surface 70 by connecting the arm 10 to the holding means, or the placement surface 70 on which the document 75 is placed is provided in the overhead image reading device 1 so that the arm 10 is fixed to the placement surface 70. The mode of the placement surface 70 and the mode of fixing the arm 10 to the placement surface 70 are not limited insofar as the arm 10 is provided so as to keep the distance between the line sensor 20 and the placement surface 70 to a constant distance.

According to an aspect of the present invention, a light source that emits light and irradiates on a region of an image read by an image reading section (hereinafter referred to as image reading region by image reading section) with light is provided, and the image reading section and the light source are held by a rotation head in a manner that the image reading section and the light source are rotatable relative to a document. With such configuration, in the case of reading an image of the document by the image reading section, it is possible that the image reading device may read an image of the document by the image reading section with the use of the light emitted from the light source. Also, since the image reading section and the light source are held by the rotation head in the relatively rotatable fashion with respect to the document, it is possible to read the image by the image reading section while irradiating the image reading region with the use of the light source by rotating both of the image reading section and the light source in a state where a distance between the image reading section and the document and a distance between the light source and the document are kept to predetermined distances. Further, since the light source irradiates the image reading region by the image reading section with light without irradiating an entire portion of the document with the light, an irradiation range is narrowed. Therefore, it is possible to suppress luminance irregularity at the portion irradiated with the irradiation light from the light source, thereby making it possible to suppress irregularity of light reflected from the portion of the document irradiated with the irradiation light. Thus, in the case of reading an image by the image reading section, it is possible to read the image while keeping the distance between the document and the image reading section to a desired distance, and keeping luminance of the reading portion to constant luminance. Also, since the light source irradiates the image reading region by the image reading section with light, the irradiation with a requisite minimum light quantity is enabled, thereby making it possible to read the image with requisite minimum power consumption. As a result, it is possible to read the image while maintaining settled image quality and suppressing an increase in power consumption.

According to an embodiment of the present invention, the image reading section and the light source are disposed in such a fashion that a scanning plane and an irradiation plane are at an identical position. Therefore, it is possible to more reliably read an image by irradiating the image reading region by the image reading section by the light source, and it is possible to more reliably reduce an irradiation range by the light source. With such configuration, it is possible to perform the reading by more reliably keeping luminance of the reading portion in the image reading by the image reading section to constant luminance as well as to suppress power consumption. As a result, it is possible to more reliably read the image while maintaining settled image quality and more reliably suppressing an increase in power consumption.

According to an embodiment of the present invention, a rotation axis for relative rotation of the image reading section and the light source with respect to the document is positioned on a plane which is identical to the scanning plane. Therefore, it is possible to read an image of the document in a two-dimensional direction by rotating the image reading section about the rotation axis. In other words, thought the image reading section is provided in such a fashion that the image reading section is capable of reading the image of the document in a one-dimensional direction, it is possible for the image reading section to read the image in a direction orthogonal to the one-dimensional direction of the image reading by the image reading section when the image reading section reads the image while rotating about the rotation axis positioned on the plane identical to the horizontal plane. Therefore, it is possible to more reliably read the image in the two-dimensional direction by using the image reading section for reading the image of the document in the one-dimensional direction. As a result, it is possible to more reliably read the image of the document with a production cost being suppressed.

According to an embodiment of the present invention, the image reading section rotates about the rotation axis to read the image of the document. Therefore, it is possible to read the image of the document in the two-dimensional direction by using the image reading section for reading the image of the document in the one-dimensional direction. As a result, it is possible to more reliably read the image of the document with a production cost being suppressed.

According to another aspect of the present invention, an arm that is fixed to a placement surface on which the document is placed is provided, and supports an image reading unit provided with the image reading section. With such configuration, it is possible that the overhead image reading device may keep a constant distance as a distance between the image reading section and the document, and it is possible to easily perform focusing when reading the image of the document by the image reading section. Also, since the image reading unit is supported by the arm, it is possible to read the image of the document while more reliably maintaining the distance between the image reading section and the light source and the distance between the image reading unit and the document to predetermined distances. Therefore, in the case of reading the image by the image reading section, it is possible to perform the reading while more reliably maintaining the distance between the document and the image reading section to the desired distance and keeping the luminance of the reading portion to the constant luminance. Further, since the image reading unit is supported by the arm, it is possible to maintain a predetermined state of position relationship between the document and the image reading unit and a position relationship between the document and the light source, thereby making it possible to more reliably irradiate the image reading region by the image reading section with the light from the light source in the requisite minimum quantity. As a result, it is possible to read the image while maintaining settled image quality and suppressing an increase in power consumption.

According to an embodiment of the present invention, since the arm is connected to a base which can be placed on the placement surface, it is possible to fix the arm only by placing the base on the placement surface in the case of fixing the arm to the placement surface, thereby making it possible to easily fix the arm to the placement surface. With such configuration, it is possible to adjust the distance between the image reading section and the document to a constant distance, and it is possible to more easily perform focusing when reading the image of the document by the image reading section. As a result, it is possible to more easily read the image while maintaining settled image quality.

According to an embodiment of the present invention, an imaging range display section is provided. Therefore, it is possible to more reliably read a desired range of image in the document by reading the image by locating an intended image reading portion within an imaging range when reading the image of the document by the image reading section. As a result, it is possible to more reliably obtain the desired image.

According to an embodiment of the present invention, since the imaging range is displayed by the imaging range display section based on a detection result of a human sensor, it is possible to display the imaging range at the time point when a user approaches to the overhead image reading device in the image reading of a document. With such configuration, it is possible to easily locate an intended image reading potion within the imaging range when reading the image of the document, and it is possible to more easily read the image of the desired range of the document. As a result, it is possible to more easily obtain the desired image.

The image reading unit and the overhead image reading device according to the preferred embodiments of the present invention attain an effect of reading an image while maintaining consistent image quality and suppressing an increase in power consumption.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading unit comprising:
   an image reading section including one-dimensionally aligned imaging elements to read an image of a document in a one-dimensional direction;
   a lens for converging light from the document to the image reading section;
   light sources each of which irradiates an image reading region read by the image reading section with light; and
   a rotation head that holds the image reading section, the lens, and the light sources in a manner that the image reading section, the lens, and the light sources are rotatable relative to the document about a rotation axis which is parallel to an alignment direction of the imaging elements, wherein
   the light sources are disposed at both sides of the lens in a direction of the rotation axis, and
   the image reading section and the light sources are disposed such that an irradiation plane indicating an irradiation range by the light sources overlaps with a scanning plane indicating a range of reading in the image reading by the image reading section.

2. The image reading unit according to claim 1, wherein the rotation axis is positioned inside a plane that is identical to the scanning plane.

3. The image reading unit according to claim 1, wherein the image reading section rotates about the rotation axis to read the image of the document.

4. An overhead image reading device comprising:
   an image reading unit including:
      an image reading section including one-dimensionally aligned imaging elements to read an image of a document in a one-dimensional direction,
      a lens for converging light from the document to the image reading section,
      light sources each of which irradiates an image reading region read by the image reading section with light, and
      a rotation head that holds the image reading section, the lens, and the light sources in a manner that the image reading section, the lens, and the light sources are rotatable relative to the document about a rotation axis which is parallel to an alignment direction of the imaging elements, wherein the light sources are disposed at both sides of the lens in a direction of the rotation axis, and the image reading section and the light sources are disposed such an irradiation plane indicating an irradiation range by the light sources overlaps with a scanning plane indicating a range of reading in the image reading by the image reading section; and
   an arm that is fixed to a placement surface on which the document is placed and supports the image reading unit.

5. The overhead image reading device according to claim 4, wherein the arm is connected to a base that is placed on the placement surface, and the arm is fixed to the placement surface when the base is placed on the placement surface.

6. The overhead image reading device according to claim 4, further comprising an imaging range display section that displays an imaging range in a case of reading the image of the document by the image reading section.

7. The overhead image reading device according to claim 6, further comprising a human sensor that detects approach of a human, wherein
   the imaging range display section displays the imaging range based on a detection result of the human sensor.

* * * * *